United States Patent
Allan et al.

(10) Patent No.: US 6,786,537 B2
(45) Date of Patent: Sep. 7, 2004

(54) ONE PIECE PLASTIC WATER MANAGEMENT SYSTEM FOR SUNROOF

(75) Inventors: Troy Allan, Howell, MI (US); Steven J. Engelgau, Royal Oak, MI (US); Hyong Chol Park, Ann Arbor, MI (US); Joachim Roeder, Muehlheim (DE); Daniel Cooney, Livonia, MI (US); Michael Cherry, Farmington Hills, MI (US); John Long, Highland, MI (US); Keith Roberts, Fowlerville, MI (US); Gregory Kerwin, Howell, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/319,283

(22) Filed: Dec. 12, 2002

(65) Prior Publication Data

US 2004/0113466 A1 Jun. 17, 2004

(51) Int. Cl.[7] .................................................. X60J 7/00
(52) U.S. Cl. .................................... 296/213; 296/216.08
(58) Field of Search ................ 296/213, 216.06–216.08

(56) References Cited

U.S. PATENT DOCUMENTS

| | | | |
|---|---|---|---|
| 3,066,976 A | * 12/1962 | Rehmann | ..................... 296/213 |
| 4,541,664 A | 9/1985 | Gallitzendorfer et al. | |
| 4,582,358 A | 4/1986 | Draper | |
| 4,844,532 A | 7/1989 | Ono et al. | |
| 4,892,351 A | 1/1990 | Ono et al. | |
| 5,029,931 A | 7/1991 | Asaba et al. | |
| 5,052,744 A | 10/1991 | Sugimoto | |
| RE34,098 E | * 10/1992 | Schleicher et al. | ......... 296/223 |
| 5,158,335 A | 10/1992 | Usuta et al. | |
| 5,332,282 A | 7/1994 | Maeda et al. | |
| 5,466,038 A | 11/1995 | Fujie et al. | |
| 5,599,059 A | 2/1997 | Shann | |
| 5,664,827 A | * 9/1997 | Mori et al. | .................. 296/213 |
| 5,902,008 A | 5/1999 | Butsuen et al. | |
| 6,189,961 B1 | 2/2001 | Poliskie et al. | |
| 6,196,625 B1 | 3/2001 | Nagashima et al. | |
| 6,286,841 B1 | 9/2001 | Foy et al. | |
| 6,334,646 B1 | 1/2002 | Oami | |
| 6,435,605 B2 | * 8/2002 | Tsuruo et al. | ................ 296/213 |
| 6,454,346 B1 | * 9/2002 | Nabuurs | ................ 296/216.06 |

FOREIGN PATENT DOCUMENTS

| | | | | |
|---|---|---|---|---|
| DE | 3626299 | * | 1/1988 | ............ 296/216.07 |
| NL | 8702838 | * | 6/1989 | ................ 296/213 |

* cited by examiner

Primary Examiner—Dennis H. Pedder
(74) Attorney, Agent, or Firm—Carlson, Gaskey & Olds

(57) ABSTRACT

A water management system of the present invention provides a sunroof drain member formed as a continuous piece. The drain member supports a sunroof guide track, and removes water from the guide track and sunroof area. The sunroof guide track is secured to the drain member by a plurality of interlocking features. By forming the interlocking features as integral parts of the guide track and drain member this prevents leakage in weakening in the areas where fastening devices would otherwise need to be attached.

27 Claims, 2 Drawing Sheets

ONE PIECE PLASTIC WATER MANAGEMENT SYSTEM FOR SUNROOF

BACKGROUND OF THE INVENTION

The present invention relates to a sunroof for a vehicle and more particularly to a water drain system for the sunroof. Generally sunroofs are available in vehicles by providing an opening in the vehicle roof above the passenger area. Often a glass window is installed so that it may move to an open or closed position. Guide rails running along the sides of the window provide tracks to accommodate moving the window. The window may be moved either manually, by the vehicle passenger, or by another source such as an electric motor. The glass is also used to protect the interior of the vehicle from weather, such as rain. Often sunroofs are provided with drains on the front and either side of the window for water to run off. It is a common arrangement to attach the drain to the guide rails for support and to drain water from the guide rails as well. Attaching the guide rails and water drain together also assists in providing a sunroof assembly that may be installed in the vehicle as a single unit, making construction of the vehicle easier.

Conventionally drains are made from metal rails which are formed in a U-shape to be positioned along the front and sides of the sunroof opening. To obtain the desired U-shape of the drains, generally the rails are either fastened together at the front corners or bent into the desired shape. Bending the rails may lead to weak spots. However, fastening them leads to leaks at the front corners of the drain and the fastening points. Sealant may be used around the fastening points to prevent or slow down leakage. Though, this often leads to a mess when shipping the assemblies prior to vehicle installation as the sealant spreads on to other assemblies and the shipping trays. The sealant also increases the difficulty in handling the assemblies.

Openings for fasteners are provided along the side portions to secure the drain to the guide rails. In addition, nozzles are located at the corners of the drain to remove water from the drain. Sealant is also used at the openings for the fastener and nozzle attachment. Consequently, there may be a problem of leakage in these areas as well. Leakage from the drain can cause the passenger compartment to become wet and may be a nuisance.

More recently drains or portions of the drain have been manufactured from polymers. The corners of the drain, or front portions can be molded into a solid piece including the drain nozzles and then attached to metal side drains using conventional fastening elements. However, the areas where the polymer pieces are fastened to the side drains may still leak or weaken over time. Sealant is still required in these areas and may also come off when shipping.

Drains have also been molded from a polymer to form a single unit. Thus far, these drains have been weak and require support from an external device such as the guide rails for the window. In addition, holes formed for fasteners to attach the drain to the guide rails have also provided areas susceptible to leakage.

Accordingly, it is desirable to provide a drain assembly for a vehicle sunroof which does not require external support, and may be fastened to the guide rails and vehicle in a manner that prevents leakage.

SUMMARY OF THE INVENTION

A water management system of the present invention provides a sunroof guide track which is secured to a drain member. The drain member supports the guide track, and removes water from the guide track and sunroof area. Drain nozzles located at the end of the drain member allow water to be cleared from the drain member.

The drain member includes a water trough and a support portion. The support portion extends from the water trough and supports the sunroof guide track. The sunroof guide track is secured to the drain member by a plurality of interlocking features. By forming the interlocking features as integral parts of the guide track and drain member this prevents leakage and weakening in the areas where fastening devices would otherwise need to be attached.

The drain member is a continuous piece formed by molding a polymeric material. The drain member is molded about the prefabricated sunroof guide track to form a solid piece. The interlocking features, and a plurality vehicle installation points are formed in the drain member by the mold. The interlocking features are primarily located on the support portion of the drain member. However, at least one of the interlocking features is located to form a side of the water trough. In general the water trough includes the first wall, a floor, and an opposing sidewall which form a U-shaped cross section.

The guide track does not extend across the rear of the water management system. The drain member is molded so that a wall forms the first side of the water trough through this area. The corner areas of the guide track have a gradual transition to form the first side of the water trough where there are no interlocking features.

The present invention therefore provides a water management system which is formed from a solid piece to remove the need to use sealant about joints. This invention also allows a water drain and guide track to be secured together while preventing leakage, and the need to use sealant.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
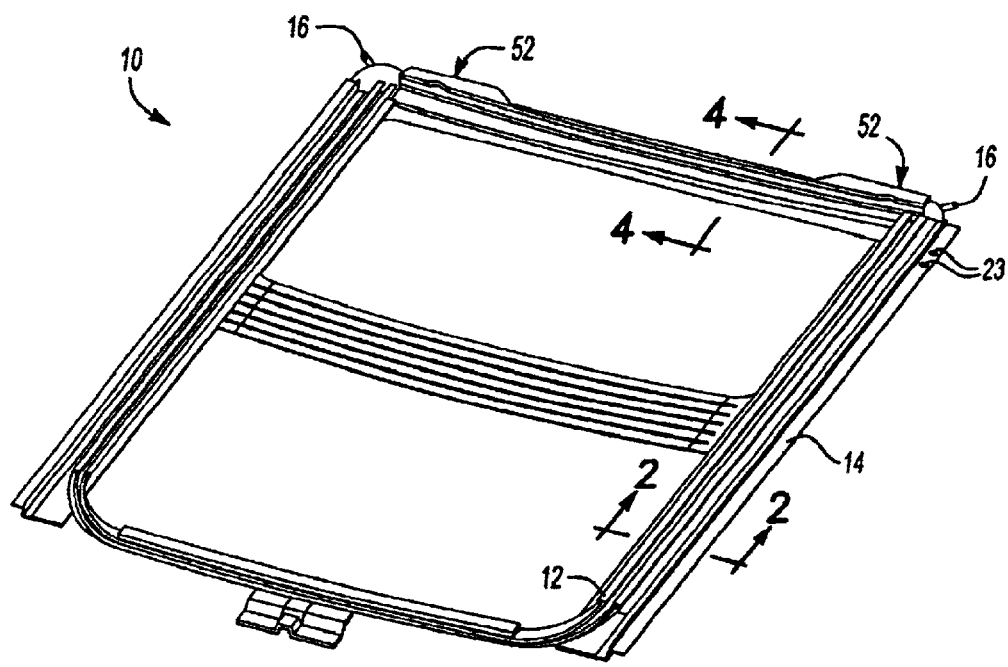
FIG. 1 is a perspective view of the sunroof frame and drain member of the present invention.

FIG. 1 is a perspective view of a water management system 10 of the present invention. The water management system 10 may be installed in an opening of a vehicle roof for a sunroof. The water management system 10 shown includes a guide track 12 for a sunroof. The guide track 12 is secured to a drain member 14. The drain member 14 operates as a support to the guide track 12. The drain member 14 also operates as a conduit to remove water from the guide track 12 and sunroof area. Drain nozzles 16 located at the end of the drain member 14 allow water to be cleared from the drain member 14. The drain member 14 is a continuous piece formed by molding a polymeric material.

Figure 2:
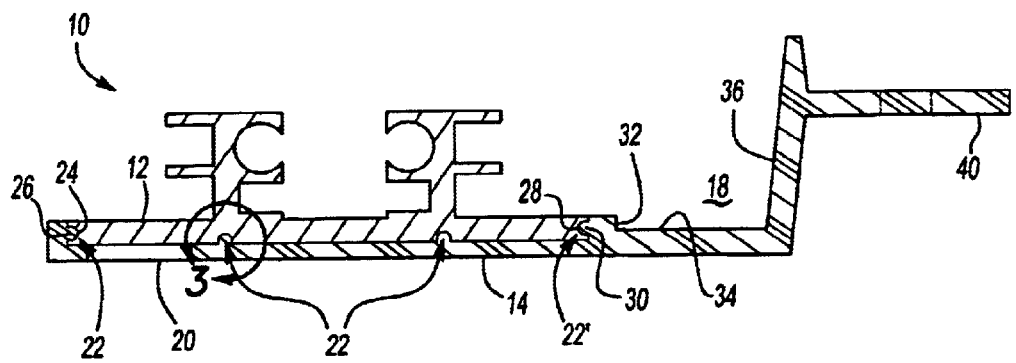
FIG. 2 is a cross-section of the drain member through 2—2 of FIG. 1.

Referring to section 2—2, shown in FIG. 2, a cross-section of the water management system 10 shows drain member 14 and guide track 12. The drain member 14 includes a water trough 18 and a support portion 20. The support portion 20 extends from the water trough 18 and supports the guide track 12. The guide track 12 is secured to the drain member 14 by a plurality of interlocking features 22. By forming the interlocking features 22 as integral parts of the guide track 12 and drain member 14 this prevents leakage and weakening in the areas where fastening devices would otherwise need to be attached.

The guide track 12 is prefabricated out of a metal, such as aluminum. The prefabricated guide track 12 is placed in a mold. The drain member 14 is molded about the guide track 12 to form a solid piece. The drain member 14 is a polymeric material. The interlocking features 22, and a plurality vehicle installation points 23 are formed in the drain member 14 by the mold. The plurality of interlocking features 22 serve to retain the guide track 12 to the drain member 14. The mold is formed such that, at least one of the plurality of interlocking features 22 is located on an opposing surface to another of the plurality of interlocking features 22.

Figure 3:
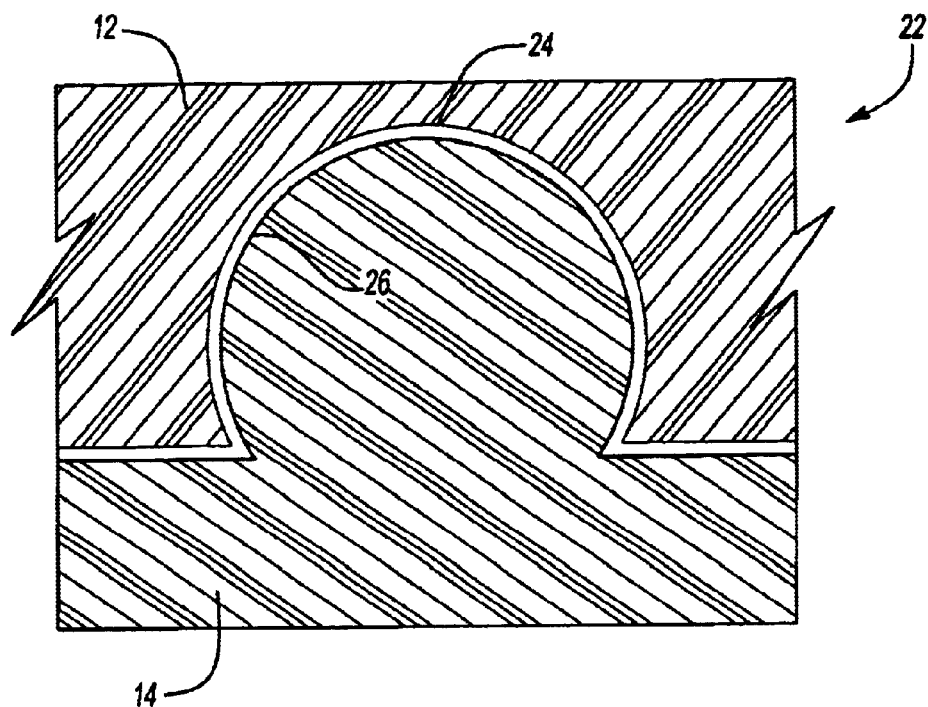
FIG. 3 is an enlarged side view of one of the plurality of interlocking features shown in FIG. 2.

The interlocking features 22 are formed by shaping first half 24 of an interlocking feature 22 in the guide track 12. A second half 26 of an interlocking feature 22 is molded in a corresponding location on the drain member 14. In the preferred embodiment, shown in FIG. 3, the first half 24 of the interlocking feature 22 is a recess in the guide track 12. The second half 26 of the interlocking feature 22 is a tab complementary to the first half 24 of the interlocking feature. In an alternate embodiment the first half 24 of an interlocking feature 22 may be a tab extending from the guide track 12 and the second half 26 may be a recess in the drain member 14.

The interlocking features are primarily located on the support portion 20 of the drain member. However, at least one of the interlocking features is located to form a side of the water trough 18. The interlocking feature 22 which forms a side of the water trough is shown in FIG. 2 as interlocking feature 22'. The interlocking feature 22' which forms a side of the water trough 18 includes a first portion 28 in the guide track 12 and a second portion 30 in the drain member 14. The second portion 30 includes a first wall 32 of the water trough 18.

In general the water trough 18 includes the first wall 32, a floor 34, and a sidewall 36. The floor 34 of the water trough 18 extends to form the support portion 20 and is generally perpendicular to the first wall 32. On an opposing end of the floor 34 from first wall 32 is a sidewall 36. The sidewall 36 extends upward and away from the floor 34 and is generally perpendicular to the floor 34 and parallel to the first wall 32.

Extending from the upper portion of the sidewall 36 and away from the water trough 18, and floor 34 is a flange 40. The flange 40 contains the plurality of vehicle installation points 23 for securing the water drain system to the vehicle. (Shown in FIG. 1). The location of the flange 40, above the water trough 18 prevents leaks between the drain member 14 and the vehicle. The vehicle installation points 23 are preferably openings in the flange 40 through which a fastening device may pass. The fastening device is preferably a screw or the like.

Figure 4:
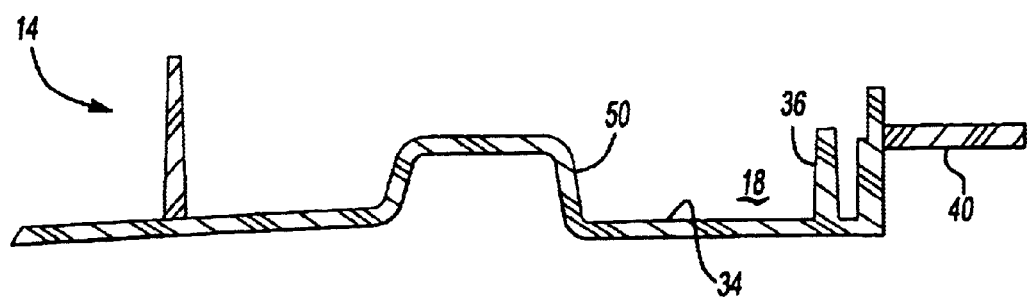
FIG. 4 is a cross section of the sunroof frame and drain member through 4—4 of FIG. 1.

Section 4—4, shown in FIG. 4, shows a cross sectional view of the drain member 14 across the rear of the water management system 10. The guide track 12 does not extend across this area. The drain member 14 is molded so that a wall 50 forms the first side of the water trough 18 through this area. At least two corner areas 52 of the guide track 12 have a gradual transition from the second portion 30 to the wall 50. The at least two corner areas 52 are molded to form the drain nozzles 16. The drain nozzles 16 are located near the floor 34 along the sidewall 36.

The foregoing description is only illustrative of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described.

For that reason the following claims should be studied to determine the true scope and content of this invention.

What is claimed is:

1. A sunroof water management system comprising:
    a guide track for a sunroof window having a first portion with a first interlocking feature including a first shape;
    a drain member having a second portion with a second interlocking feature including a second shape complementary to said first shape;
    said first interlocking feature and said second interlocking feature securing said guide track and said drain member together;
    a drain trough formed on a first side of said second portion for draining water from the system, wherein a cross-section of said drain trough comprises a drain floor which is connected to, and substantially perpendicular to, said second portion, and a sidewall connected to an opposing side of said drain floor; and
    a flange extending generally perpendicularly from said sidewall away from said drain trough, said flange having a plurality of vehicle attachment points.

2. The system as recited in claim 1, wherein a first wall of said drain trough is included in said second portion.

3. The system according to claim 1, wherein a drain nozzle extends from a portion of said sidewall near said drain floor.

4. The system as recited in claim 1, further including a third interlocking feature on said guide track complementary in shape and secured to a fourth interlocking feature on said drain member.

5. The system as recited in claim 4, wherein said forth interlocking feature is on an opposing surface of the drain member to said first interlocking feature.

6. The system as recited in claim 1, wherein said first shape is a recess in said first portion and said second shape is a tab extending from said second portion toward the guide track.

7. The system according to claim 1, wherein said guide track is formed from aluminum and said drain member is formed from a polymeric material.

8. A sunroof water management system comprising:
    a pair of spaced apart guide tracks for a sunroof window, each of said guide tracks having a first portion with a first interlocking feature including a first shape;
    a continuous, U-shaped drain member having a pair of spaced apart longitudinal portions supporting said guide tracks and a lateral portion interconnecting said longitudinal portions, at least one of said longitudinal portions and said lateral portion forming a corner having a drain nozzle;
    said longitudinal portions each having a second portion with a second interlocking feature including a second shape complementary to said first shape, said first interlocking features and said second interlocking features securing said guide tracks and said drain member together; and each said second portion providing a first side forming a longitudinal drain trough along one of said longitudinal portions, each said first side transitioning to a lateral wall on said lateral portion forming a lateral drain trough along said lateral portion fluidly connecting to said longitudinal drain troughs along said longitudinal portions.

9. The system as recited in claim 8, wherein a cross-section of each said longitudinal drain trough comprises a drain floor which is connected and substantially perpendicular to said second portion, and a sidewall connected to an opposing side of said drain floor.

10. The system as recited in claim 9, wherein a first wall of each said longitudinal drain trough is included in said second portion.

11. The system as recited in claim 9, wherein a flange extends generally perpendicularly from said sidewall away from each of said drain troughs, said flange having a plurality of vehicle attachment points.

12. The system according to claim 8, wherein said guide tracks are formed of aluminum and said drain member is formed of a polymeric material.

13. The system according to claim 8, wherein each said longitudinal portion includes a support floor extending from said second portion, parallel to said longitudinal drain trough, and a support wall extending transversely from an opposing end of said support floor such that each of said longitudinal portions receives one of said guide tracks among said support floor, said support wall and said second portion.

14. The system according to claim 13, wherein said second interlocking feature extends relative to said second portion in a direction generally parallel to said support floor.

15. The system according to claim 14, wherein said support wall has a fourth interlocking feature, complementary in shape and secured to a third interlocking feature on said guide track.

16. The system according to claim 8, wherein said first side of said second portion forms a first wall of said longitudinal drain trough and an oppositely facing second side includes said second interlocking feature.

17. The system according to claim 1, wherein said first interlocking feature and said second interlocking feature secure said guide track to said drain member without any fasteners extending through said guide track or through said drain member to secure said guide track to said drain member.

18. The system according to claim 1, wherein said drain member includes a support floor extending from said second portion, parallel to said drain trough, and a support wall extending transversely from an opposite end of said support floor such that said drain member receives said guide track among said support floor, said second portion and said support wall.

19. The system according to claim 18, wherein said second interlocking feature extends parallel to said support floor and wherein said guide track includes a third interlocking feature complementary in shape to a fourth interlocking feature on said support wall.

20. The system according to claim 1, wherein said first side of said second portion forms a first wall of said drain trough and an oppositely facing second side of said second portion includes said second interlocking feature.

21. A sunroof water management system comprising:

a pair of spaced apart guide tracks for a sunroof window, each of said guide tracks having a first portion with a first interlocking feature having a first shape;

a continuous, U shaped drain member having a pair of spaced apart longitudinal portions supporting said guide tracks and a lateral portion interconnecting said longitudinal portions;

said longitudinal portions each having a second portion with a second interlocking feature having a second shape complementary to said first shape, said first interlocking features and said second interlocking features securing said guide tracks and said drain member together;

a longitudinal drain trough formed on each of said longitudinal portions by said second portion, a drain floor which extends transversely to said second portion, and a sidewall extending transversely from said drain floor and spaced from said second portion; and a flange extending generally perpendicularly from said sidewall away from said drain trough, said flange having a plurality of vehicle attachment points.

22. The system as recited in claim 21, wherein at least one of said longitudinal portions and said lateral portion form a corner having a drain nozzle.

23. The system according to claim 21 wherein said guide track is formed of aluminum and said drain member is formed of a polymeric material.

24. The system according to claim 21 wherein each said longitudinal portion includes a support floor extending from said second portion away from said drain floor and a support wall extending transversely from said support floor and spaced away from said second portion, said guide track received by said drain member among said second portion, said support floor and said support wall.

25. The system according to claim 24, wherein said second interlocking feature extends relative to said second portion in a direction parallel to said support floor.

26. The system according to claim 25, wherein said guide track includes a third interlocking feature complementary in shape with and secured to a fourth interlocking feature on said support wall.

27. The system according to claim 21, wherein said first interlocking features and said second interlocking features secure said guide tracks to said drain member without any fasteners extending through said guide tracks or through said drain member to secure said guide tracks to said drain member.

* * * * *

UNITED STATES PATENT AND TRADEMARK OFFICE
CERTIFICATE OF CORRECTION

PATENT NO. : 6,786,537 B2
DATED : September 7, 2004
INVENTOR(S) : Allan et al.

It is certified that error appears in the above-identified patent and that said Letters Patent is hereby corrected as shown below:

Column 4,
Line 46, "forth" should read as -- fourth --.

Signed and Sealed this

Seventh Day of December, 2004

JON W. DUDAS
*Director of the United States Patent and Trademark Office*